United States Patent [19]

Mikalsen

[11] Patent Number: 4,641,154

[45] Date of Patent: Feb. 3, 1987

[54] INK JET APPARATUS WITH RESERVOIR HAVING A TILT VALVE SERVING AS FILL PORT AND AIR VENT

[75] Inventor: Arthur Mikalsen, Carmel, N.Y.

[73] Assignee: Exxon Printing Systems, Inc., Brookfield, Conn.

[21] Appl. No.: 667,903

[22] Filed: Nov. 2, 1984

[51] Int. Cl.⁴ .............................................. G01D 15/16

[52] U.S. Cl. .................................... 346/140 R; 137/43

[58] Field of Search ..................... 346/140 R, 140 PD; 137/43

[56] References Cited

U.S. PATENT DOCUMENTS 4,352,364 10/1982 Orsino .................................. 137/43

4,419,677 12/1983 Kasugayama ................ 346/140 PD 4,539,568 9/1985 Lewis .......................... 346/140 PD

*Primary Examiner*—E. A. Goldberg

*Assistant Examiner*—Mark Reinhart

[57] ABSTRACT

Ink jet apparatus utilizing hot melt ink, having a reservoir system which contains the ink and maintains it in its melted phase when the apparatus is in use, and a tilt valve positioned above the reservoir, the valve having respective normally opened and closed positions, and providing both an air vent to the reservoir and a fill port for draining melted ink into the reservoir when in its normally opened position. Tilt valve may be placed into its closed position either by tilting the reservoir beyond a predetermined angle, or by automatic tilting of the valve actuator when the ink jet priming system is activated.

12 Claims, 5 Drawing Figures

INK JET APPARATUS WITH RESERVOIR HAVING A TILT VALVE SERVING AS FILL PORT AND AIR VENT

BACKGROUND OF THE INVENTION

This invention lies in the area of ink jet apparatus and, more particularly, ink jet apparatus utilizing hot melt ink and having a normally vented reservoir.

The use of hot melt ink in ink jet systems, which ink is normally in a solid or frozen state but attains a liquid state of phase when its temperature is raised, has presented a number of advantages to ink jet apparatus. For a discussion of the characteristics of such ink and the uses thereof, reference is made to U.S. Pat. No. 4,390,369 and pending U.S. applications U.S. Ser. No. 610,627, filed May 16, 1984; Ser. No. 565,127, filed Dec. 23, 1983; and Ser. No. 644,452, filed Aug. 27, 1984, all assigned to the same assignee as this invention and incorporated herein by reference.

The use of hot melt ink creates special design needs for the reservoir system. It is necessary periodically to receive an ink pellet, melt it and drain the melted ink through a fill port into the reservoir. Also, it is necessary to have an air vent for normally venting the reservoir to atmospheric air. At the same time, any design must take into account the fact that the use of hot melt ink creates a special need for frequent repriming of the system. One of the characteristics of hot melt ink is that it degenerates faster the longer it is maintained in its liquid phase, with the result that it is advantageous to permit cooling and freezing of the ink when the apparatus is not in use. However, the hot melt ink contracts when it cools to a temperature below the melting point, which contraction of the ink results in depriming of the system. Thus, such hot melt ink apparatus has an increased need for an efficient repriming system.

The fact that the hot melt ink must be vented to atmosphere creates a safety problem. The ink is maintained at about 200° F., and an operator who carries or lifts the appartatus before the ink has cooled runs a danger of spilling that hot ink. Thus, some means of automatically preventing spillage is required.

The above noted characteristics of hot melt ink systems lead to the design requirement of a two way valve, which valve acts as both as an air vent and as a fill port in its normally opened position, and which can be operated to a closed position when priming of the reservoir is undertaken. At the same time, there is a need, not previously met, for means to automatically close the valve, or port, under any circumstance where the reservoir is tilted to a degree where there is a likelihood of spillage of ink due to the tilting. A tilt valve has been utilized in the area of storage batteries, but such valve provides only an air vent and does not comprise a fill port.

SUMMARY OF THE INVENTION

It is an object of this invention to provide an ink jet system having a reservoir system, the reservoir system having a valve which presents both a normally open position for use as an air vent and fill port, and a closed position for use during a depriming operation, the valve also having tilt-sensitive characteristics whereby it is automatically closed either when the reservoir is tilted past a predetermined angle or when the repriming system is enabled.

It is another object of this invention to provide a reservoir system for an ink jet apparatus, the reservoir system comprising an inlet through which melted ink from a hot melt type ink pellet can be drawn into the reservoir, the inlet also being closable by a tilt valve mechanism which acts automatically upon tilting of the reservoir past a predetermined angle.

It is another object of this invention to provide a reservoir system for use in ink jet apparatus, the system having a tilt valve which, when in its normally open position, provides an air vent to said reservoir and a fill port, and a priming system having means for automatically placing said tilt valve in its closed position when said priming system is initiated.

It is another object of this invention to provide a safe means of automatically preventing spillage of hot ink on the operator of the ink jet apparatus.

In accordance with the above and other objects, the invention comprises ink jet apparatus utilizing hot melt ink, having a reservoir system containing ink and for maintaining the ink in its melted phase when the apparatus is in use, and a priming system for applying priming pressure to the reservoir for repriming the system following non-use of the apparatus. A tilt valve is positioned in the upper cover or roof of the reservoir, the tilt valve having closed and open positions, and providing both an air vent to the reservoir and a fill port for draining melted ink into the reservoir when in its normally open position. The tilt valve is placed in its closed position either by tilting the reservoir beyond a predetermined angle, or by automatic action when the priming system is activated. The tilt valve further contains capillary means for aiding in drawing ink from a pellet receiving station down into the reservoir.

DESCRIPTION OF THE PREFERRED EMBODIMENTS

Figure 1:
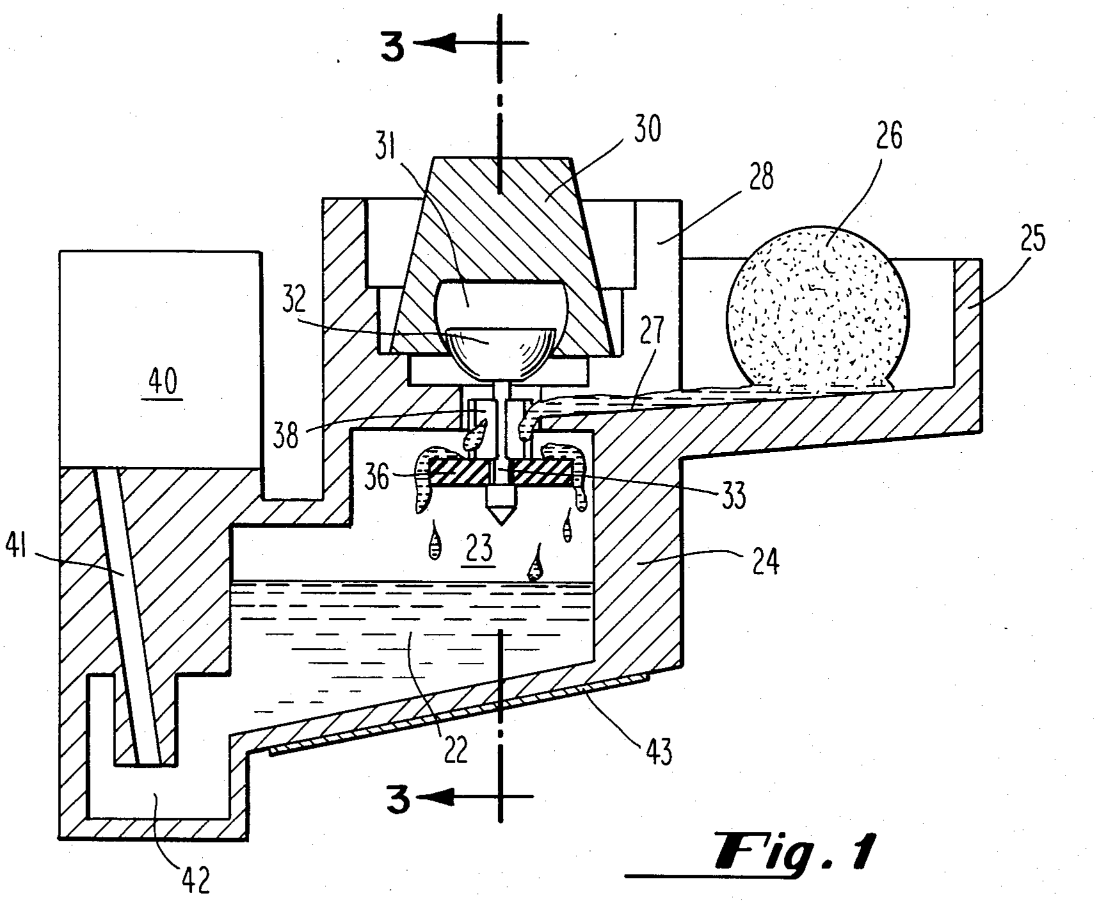
FIG. 1 is a schematic side cross-sectional view of the ink jet apparatus of this invention, illustrating the tilt valve in its normally open position.

Referring now to FIG. 1, there is shown a schematic view of a portion of the ink jet apparatus of this invention, including a tilt valve which provides both a fill port for introducing ink into the reservoir and an air vent to the reservoir. Ink 22 is maintained in reservoir 23, which is defined by reservoir housing 24. A heater as shown positioned at 43 is used to melt the ink. An ink pellet 26 is placed in pellet receptacle 25, which receptacle is intergral with and part of reservoir housing 24. Housing 24 and receptacle 25 are made of good heat conducting material, and are heated suitably by the heater 43 as illustrated. The melted ink from pellet 26 flows along a channel 27 which is cut through valve housing 28.

Valve housing 28 is configured to support a tilt valve which comprises substantially bell-shaped valve actuator 30, stem head 32, and valve seal 36. The actuator 30 has an opening 31 configured as shown, into which is placed the stem head 32. The stem head 32 is substantially hemispherical in shape, such that it can rotate within the curved walls of opening 31. A capillary spacer 38, illustrated in more detail in FIGS. 4A and 4B, surrounds stem portion 33.

Figure 2:
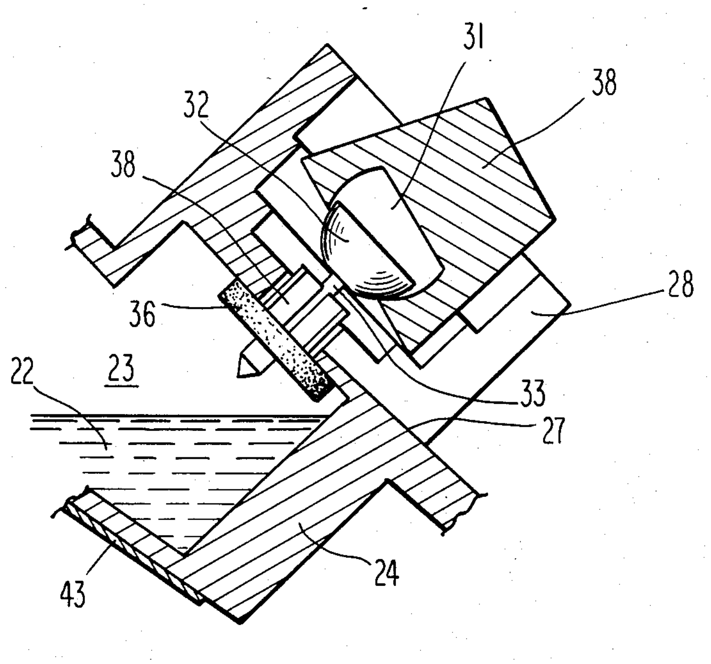
FIG. 2 is an illustration of the tilt valve when the reservoir is tilted to the point of closing the valve, thereby sealing the reservoir to prevent spillage.

Referring now also to FIG. 2, where the tilt valve is shown with the reservoir in a tilted position such that the valve is closed, the operation of the tilt valve in the environment of the ink reservoir is explained. When the reservoir is substantially horizontal, stem 33 is substantially vertical, and there is sufficient clearance between seal 36 and the opening defined by valve housing 28, such that there is communication between reservoir 23 and the outside world. Ink flows along the channel 27 and is free to flow down along spacer 38 and into the reservoir. If the reservoir is tipped, or tilted by a small amount, the curved stem head 32 rotates within actuator opening 31, such that the stem remains substantially vertical and the seal does not rise relative to the valve housing. However, when the tilt exceeds a predetermined angle (e.g. 45°), the center of gravity of actuator 30 causes the actuator to tilt and pivot on one side, as seen in FIG. 2. This pivoting action of the actuator pulls the stem upward, clamping seal 36 against the opening defined by valve housing 28, thereby closing the valve. Thus, any tilting of the reservoir, accidentally or otherwise, is safeguarded against once the tilt exceeds a predetermined angle. The angle is set as a function of the maximum amount of ink placed into the reservoir, so that spillage of ink onto an operator is safeguarded against. As used herein, tilt means any rotation relative to the horizontal plane from the normal reservoir position.

Figure 3:
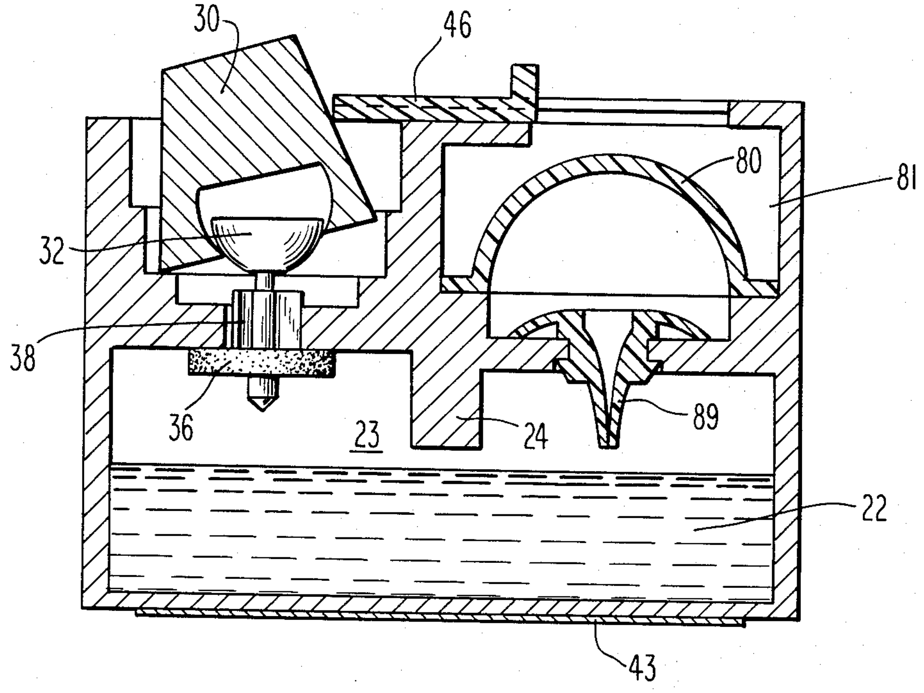
FIG. 3 is a schematic representation along lines 3—3' of FIG. 1, showing the tilt valve in combination with priming means for priming the reservoir.

Referring now to FIG. 3, the tilt valve is schematically illustrated relative to a priming system utilized with the apparatus of this invention. A housing 81, normally closed at the top by a slidable roof element 46, houses a bulb 80 of conventional form, which can be manually actuated to apply pressure through a one-way valve 89. Reference is made to co-pending U.S. application Ser. No. 661,925, filed Oct. 15, 1984, assigned to the same assignee, which is incorporated by reference herein. The referenced case provides details of the working of the priming system, including the one-way valve 89. The bulb 80 and valve 89 provide a form of pressure pump, which provides pressure to the reservoir 23 for repriming purposes. Of course, during the repriming operation, it is required that any normally open vent to the atmosphere be closed. Accordingly, element 46 is configured and positioned that such that when it is opened in order to enable or activate the priming system, it provides a force against actuator 30. The force applied by element 46 pivots actuator 30 and draws seal 36 against the valve opening, thereby placing the valve into a closed position. There is thus disclosed an enabling means for enabling the priming system, which enabling means also comprises means for automatically closing the tilt valve to its closed position. This ensures that during the priming operation the vent must be closed, enabling adequate build up of the priming pressure for carrying out the priming operation.

Figure 4A:
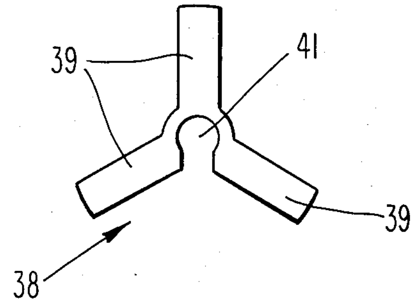
FIG. 4A is a top sectional view of a capillary spacer used with the tilt valve of this invention.
Figure 4B:
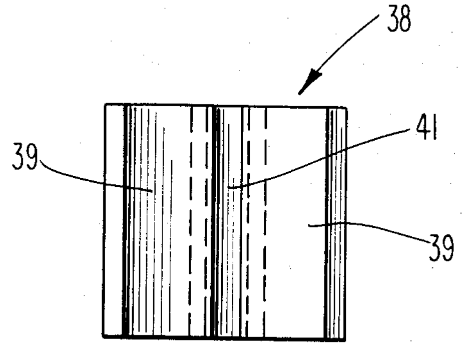
FIG. 4B is a side view of the capillary spacer used with the tilt valve of this invention.

Referring to FIGS. 4A and 4B, there is shown additional detail of the capillary spacer used with the tilt valve of this invention. Spacer 38 has a central axial opening 41, which fits around the stem 33 of the tilt valve. It also comprises a plurality (e.g., 3) of fingers 39 which provide additional surface along the top to bottom length of the spacer. This additional surface aids in providing capillary action for drawing ink from the inlet 27 down into the reservoir 23. Of course, when the ink pellet has just melted and there is a substantial pressure head generated by the melted ink, the ink flows under the force of gravity. However, in practice it is has been found that often, even with a tilted surface of receptacle portion 25, a lot of ink does not flow over the edge and down through the valve opening. The capillary spacer of this invention provides a substantial improvement in its ability to draw the ink down into the reservoir.

As seen fully in FIG. 1, the ink 22 in reservoir 23 flows down a tilted reservoir base into a sump 42, from where it is drawn through a passage way 41 up into the ink jet head portion which is represented schematically. The ink jet head may be of any known configuration, and the details are not pertinent to the subject invention. Reference is made to the referenced patents and applications set forth under the BACKGROUND OF THE INVENTION, for details of typical ink jet head structures which can be utilized with this invention.

I claim:

1. An ink jet type apparatus having a reservoir, receiving means for receiving a hot melt ink pellet and for melting same, inlet means positioned above said reservoir and in communication with said receiving means and said reservoir for introducing melted ink into said reservoir, ink jet head means in communication with said reservoir for producing ink jet droplets, said inlet means comprising a tilt valve having a normally open position for venting air from said reservoir and providing a fill port for passage of ink into said reservoir, and having a closed position when said reservoir is tilted more than a predetermined angle, and priming means for priming said reservoir and print head, said priming means having displacing means for displacing said tilt valve to said closed position.

2. The ink jet apparatus according to claim 1, wherein said displacing means comprises enabling means for enabling said priming means.

3. The ink jet apparatus according to claim 1, wherein said priming means comprises a pressure pump and said displacing means is a manually displacable element which is displaced to provide access to said pressure pump, said displacable element being in position to tilt said tilt valve when displaced to provide access to said pressure pump.

4. The ink jet apparatus according to claim 1, wherein said priming means comprises means for enabling operation of said priming means and for concurrently automatically operating said displacing means to displace said tilt valve.

5. The ink jet apparatus according to claim 1, wherein said tilt valve comprises a capillary means for aiding the flow of ink by capillary action from said receiving means into said reservoir.

6. The ink jet apparatus according to claim 5, wherein said tilt valve includes a stem, and said capillary means comprises a spacer around said stem.

7. The ink jet apparatus according to claim 6, wherein said spacer comprises a central portion which substantially surrounds said stem, and a plurality of fingers radiating outwardly from said stem.

8. The ink jet apparatus according to claim 1, wherein said tilt valve provides the only air vent for said reservoir when said tilt valve is in its open position.

9. The ink jet apparatus according to claim 1, wherein said tilt valve comprises an actuator with a stem suspended swingly downward therefrom and a valve opening through which said stem is suspended, and said inlet means comprises a channel which communicates between said receiving means and said valve opening.

10. Ink jet type apparatus having a reservoir, pellet receiving means for receiving a hot melt ink pellet and melting same, inlet means positioned above said reservoir and in communication with said receiving means and said reservoir for introducing melted ink into said reservoir, ink jet head means in communication with said reservoir for producing ink jet droplets, said inlet means comprising a tilt valve have a normally open position for venting air from said reservoir and providing a fill port for passage of ink into said reservoir, and having a closed position when said reservoir is tilted more than a predetermined angle, said tilt valve further comprising capillary means for drawing ink from said pellet receiving means into said reservoir.

11. Ink jet type apparatus having a reservoir, pellet receiving means for receiving a hot melt ink pellet and melting same, ink jet head means in communication with said reservoir for producing ink jet droplets, a tilt valve positioned above said reservoir and having a normally open position in which it provides an air vent to said reservoir while providing a fill port of passage of ink into said reservoir, and having a closed position when said reservoir is tilted more than a predetermined angle, and priming means for priming said reservior and said print head, said priming means having displacing means for displacing said tilt valve to said closed position.

12. Ink jet type apparatus having a reservoir, ink receiving means for receiving ink, inlet means for providing an inlet passage between said ink receiving means and said reservoir, an ink jet head in communication with said reservoir, a priming system for priming said reservoir, and a two way valve positioned above said reservoir, said valve having a normally open position for venting air to said reservoir and providing a fill port for passsage of ink into said reservoir, and a closed position when said reservoir is tilted beyond a given angle and when said priming system is enabled.

* * * * *